United States Patent
Jiang et al.

(10) Patent No.: US 10,899,635 B2
(45) Date of Patent: Jan. 26, 2021

(54) SEAWATER DESALINATION DEVICE OF INDUSTRIAL EXHAUST HEAT-DRIVEN EJECTOR REFRIGERATION AND APPLICATION METHOD THEREOF

(71) Applicant: Dongguan University of Technology, Dongguan (CN)

(72) Inventors: Runhua Jiang, Dongguan (CN); Huibin Yin, Dongguan (CN); Baiman Chen, Dongguan (CN); Yanxue Zhou, Dongguan (CN)

(73) Assignee: Dongguan University of Technology, Dongguan (CN)

( * ) Notice: Subject to any disclaimer, the term of this patent is extended or adjusted under 35 U.S.C. 154(b) by 0 days.

(21) Appl. No.: 16/432,889

(22) Filed: Jun. 5, 2019

(65) Prior Publication Data

US 2020/0031688 A1   Jan. 30, 2020

(30) Foreign Application Priority Data

Jul. 26, 2018 (CN) .......................... 2018 1 0836756

(51) Int. Cl.
*C02F 1/26* (2006.01)
*B01D 53/26* (2006.01)
(Continued)

(52) U.S. Cl.
CPC ............ *C02F 1/265* (2013.01); *B01D 53/265* (2013.01); *C02F 1/12* (2013.01); *C02F 2103/08* (2013.01); *C02F 2303/10* (2013.01)

(58) Field of Classification Search
None
See application file for complete search history.

(56) References Cited

U.S. PATENT DOCUMENTS

| 3,440,147 A | * | 4/1969 | Rannenberg | C02F 1/16 203/11 |
| 2005/0183440 A1 | * | 8/2005 | Holtzapple | B01D 1/0058 62/333 |

FOREIGN PATENT DOCUMENTS

| GB | 716603 A | * | 10/1954 | ................. C02F 1/16 |
| GB | 954917 A | * | 4/1964 | ........... B01D 1/0088 |

OTHER PUBLICATIONS

Chunnanod, K., et al., Ejectors: applications in refrigeration technology, Renewable and Sustainable Energy Reviews, 2004, vol. 8, pp. 129-155. (Year: 2004).*
(Continued)

*Primary Examiner* — Derek N Mueller
(74) *Attorney, Agent, or Firm* — JCIPRNET

(57) ABSTRACT

A seawater desalination device of industrial exhaust heat-driven ejector refrigeration and an application method thereof. The seawater desalination device comprises a seawater collecting pool, a low-pressure seawater storage tank, an ejector refrigeration system and a fresh water storage tank which are fluidly connected; the ejector refrigeration system comprising a nozzle for spraying low-pressure vapor, a mixing chamber, a diffuser, a first heat-exchanger, a condenser, a condensate pump and a generator; bottom of the low-pressure seawater storage tank being connected with a second heat-exchanger; the mixing chamber being connected with the nozzle, the diffuser and the low-pressure seawater storage tank, respectively; and the diffuser, the first heat-exchanger, the condenser and the fresh water storage tank being successively connected.

7 Claims, 1 Drawing Sheet

(51) Int. Cl.
 *C02F 1/12* (2006.01)
 *C02F 103/08* (2006.01)

(56) References Cited

OTHER PUBLICATIONS

Khawaji, et al., Advances in seawater desalination technologies, 2008, Desalination, vol. 221, pp. 47-69 (Year: 2008).*
Yu, J., et al., A new ejector refrigeration system with an additional jet pump, 2006, Applied Thermal Engineering, vol. 26, pp. 312-319. (Year: 2006).*

* cited by examiner

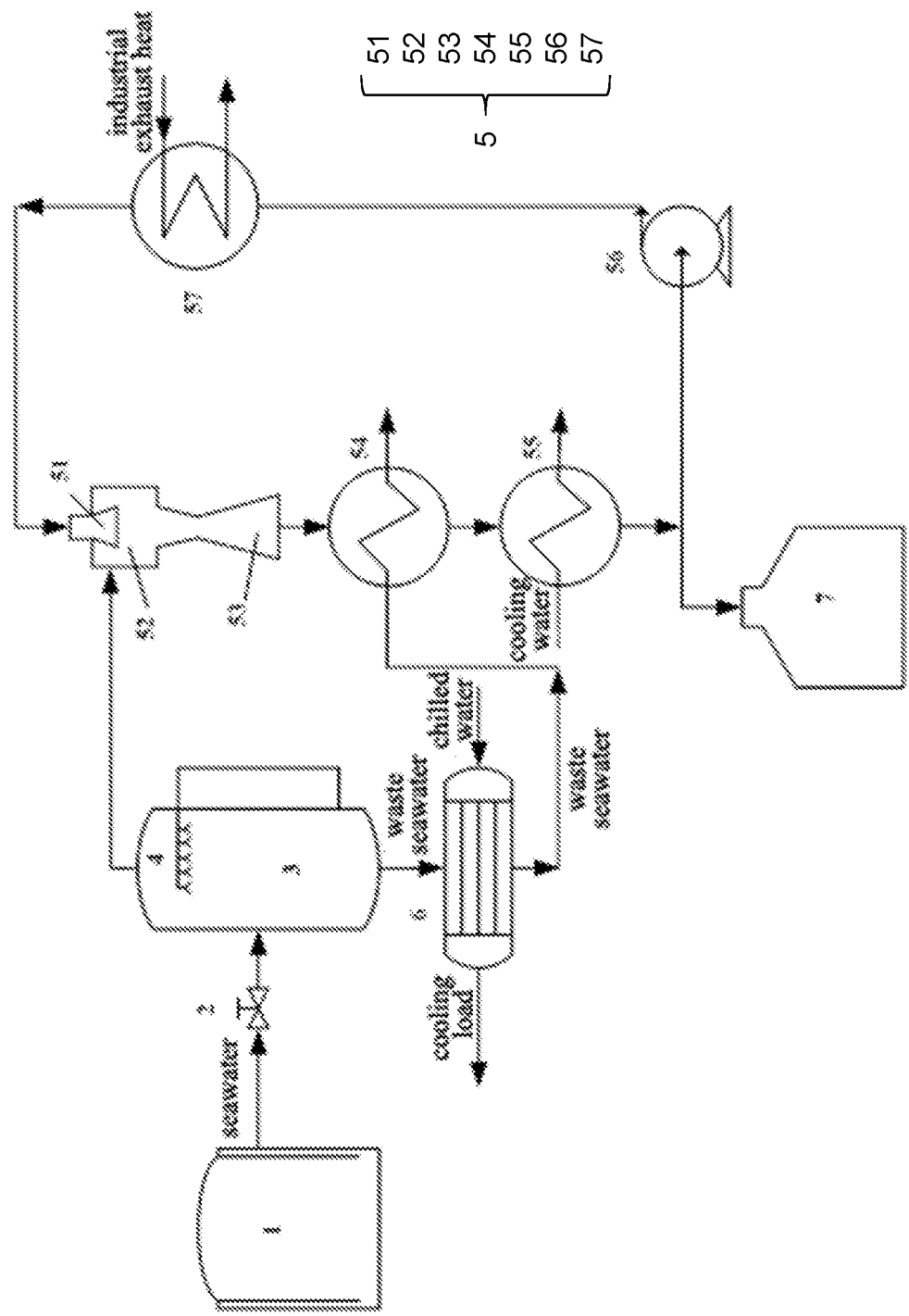

SEAWATER DESALINATION DEVICE OF INDUSTRIAL EXHAUST HEAT-DRIVEN EJECTOR REFRIGERATION AND APPLICATION METHOD THEREOF

CROSS-REFERENCE TO RELATED APPLICATION

This application claims priority to Chinese patent application No. 201810836756.8, filed Jul. 26, 2018, the contents of which are incorporated herein by reference in their entirety.

TECHNICAL FIELD OF THE INVENTION

The present invention relates to the field of energy technology and seawater desalination, and specifically relates to a seawater desalination device of industrial exhaust heat-driven ejector refrigeration and an application method thereof.

BACKGROUND OF THE INVENTION

With continuing development of industry, the energy consumption rises sharply in recent years. There is a large amount industrial exhaust heat which mainly comes from industrial furnaces, thermal energy utilization equipment, thermal power plants, various reactions during chemical process and the like. At present, the recovery rate of industrial exhaust heat in China is relatively low, and a great deal of exhaust heat has not been sufficiently used which leads to severe waste of energy and serious environment pollution as well. Such industrial exhaust heat accounts for 17%-67% of total fuel consumption thereof, and 60% of the industrial exhaust heat can be recovered. Therefore, recovery and utilization of industrial exhaust heat is an important research topic to its extensive applications.

As fresh water shortage becomes increasingly serious, many cities are suffering water shortage. Seawater desalination technology has been used more often as a technology of increasing amount of fresh water. At present, seawater desalination technology can be classified into thermal method and membrane method according to the desalination and separation process. In the thermal method, seawater is heated by heat energy, and the water is evaporated to produce steam, then the steam is condensed into fresh water. However, method and structure of device are complicated, and it requires large energy consumption during the seawater desalination process, resulting in high cost of seawater desalination. Thus, using industrial exhaust heat is an important method for reducing the cost of seawater desalination.

Ejector refrigeration driven by heat energy has simple structure, convenient processing, no moving parts, long life time and so on, but its efficiency is relatively low. Due to application of compression refrigeration which has relatively high efficiency, the development of ejector refrigeration suffers a trough period. In recent years, since the compression refrigeration needs high grade of electric energy and meanwhile causes apparent environmental issues, the ejector refrigeration has drawn people's attention once more. As a friendly refrigerant, water has several characteristics such as low generating pressure, high potential heat and low cost, and thus water is often used as the refrigerant in ejector refrigeration system which is driven by heat energy. According to the characteristics of ejector refrigeration system and the principle of seawater desalination, an industrial waste heat-driven ejector refrigeration system is proposed in this invention to perform seawater desalination, and meanwhile the cooling load can be supplied to users by the proposed system. Such device has a simple structure, low cost and long life time etc., and it can use industrial exhaust heat efficiently, which can improve the energy efficiency and provide a good seawater desalination effect.

BRIEF SUMMARY OF THE INVENTION

In order to overcome at least one drawbacks in the aforementioned prior art, the present invention provides a seawater desalination device of industrial exhaust heat-driven ejector refrigeration and an application method, which can realize efficient recovery and utilization of industrial exhaust heat, and this device can provide fresh water for domestic or industrial use through seawater desalination and cooling load to users simultaneously. Through this device, the energy efficiency will be improved and the environmental pollution and cost will be sharply reduced.

In order to solve the above technical problems, the present invention adopts the following technical solutions:

A seawater desalination device of industrial exhaust heat-driven ejector refrigeration is provided. The seawater desalination device comprises a seawater collecting pool, a low-pressure seawater storage tank, an ejector refrigeration system and a fresh water storage tank which are successively connected; the ejector refrigeration system comprising a nozzle for spraying low-pressure vapor, a mixing chamber, a diffuser, a first heat-exchanger, a condenser, a condensate pump and a generator; bottom of the low-pressure seawater storage tank being connected with a second heat-exchanger; the mixing chamber being connected with the nozzle, the diffuser and the low-pressure seawater storage tank, respectively; and the diffuser, the first heat-exchanger, the condenser and the fresh water storage tank being successively connected.

The present invention provides a seawater desalination device of industrial exhaust heat-driven ejector refrigeration, which achieves efficient recovery and utilization of industrial exhaust heat, and this device can provide fresh water for domestic or industrial use through seawater desalination and cooling load to users simultaneously. Through this device, the energy efficiency will be improved and the environmental pollution and cost will be sharply reduced.

Preferably, the second heat-exchanger is connected with the first heat-exchanger.

Preferably, the condenser, the condensate pump, the generator and the nozzle are successively connected.

Preferably, the seawater desalination device further comprises a sprayer, the sprayer being disposed at a top position of the low-pressure seawater storage tank and connected with the low-pressure seawater storage tank via a pipe.

Preferably, a throttle valve for throttling and depressurization is disposed between the seawater collecting pool and the low-pressure seawater storage tank.

The present invention provides an application method for the seawater desalination device of industrial exhaust heat-driven ejector refrigeration. The application method comprises the following steps:

step 1: seawater from the seawater collecting pool is throttled and depressurized through the throttle valve, and then the seawater runs into the low-pressure seawater storage tank;

step 2: after step 1, the seawater in the low-pressure seawater storage tank is sprayed by the sprayer, a low-pressure vapor generated by evaporation of seawater is drawn in the mixing chamber and mixed with a low-pressure vapor generated through the nozzle;

step 3: after step 2, the mixed vapor enters the diffuser for adiabatic compression and pressurization to a corresponding condensing pressure, subsequently enters the first heat-exchanger to be cooled by the waste seawater from the second heat-exchanger, and then is completely cooled into condensed water by the cooling water in the condenser;

step 4: after step 3, the condensed water is divided into two parts, a part of the condensed water runs into the fresh water storage tank for storage and provision as fresh water to meet users' demand; after being pressurized by the condensate pump, the other part of the condensed water runs into the generator and is heated by industrial exhaust heat to produce a high-temperature high-pressure vapor, which enters the nozzle; the waste seawater in the low-pressure seawater storage tank after evaporation of water has a relatively low temperature, and a cooling load can be supplied for users by heat-exchanging with chilled water through the second heat-exchanger.

Preferably in step 1, pressure of the seawater which from the seawater collecting pool is throttled through the throttle valve is decreased and equals to a pressure of the low-pressure seawater storage tank.

Preferably, the low-pressure seawater storage tank is adiabatic, and water in the low-pressure seawater storage tank is evaporated into vapor. Because water evaporation process needs to absorb heat, the waste seawater temperature in the low-pressure seawater storage tank decreases due to loss of heat.

Compared with the prior art, the present invention has the following beneficial effects:

1. The present invention provides a novel seawater desalination device of industrial exhaust heat-driven ejector refrigeration, which is driven by the industrial exhaust heat, thus effectively utilizing the industrial exhaust heat, reducing the environmental pollution and enhancing the energy efficiency.
2. The present invention provides a novel seawater desalination device of industrial exhaust heat-driven ejector refrigeration, which produces fresh water for domestic or industrial use, and also supplies the cooling load that the users require, thus achieving a goal of multi output.
3. The present invention provides a novel seawater desalination device of industrial exhaust heat-driven ejector refrigeration, which uses water as a working medium, and therefore no substances which result in environmental pollution are produced during operation of the entire device which has simple structure, low cost and long life time, being a novel seawater desalination technology with energy conservation and environmental protection.

BRIEF DESCRIPTION OF THE DRAWINGS

FIG. 1 shows a principle schematic diagram of a seawater desalination device of industrial exhaust heat-driven ejector refrigeration.

DETAILED DESCRIPTION OF THE INVENTION

The present invention is further described with the following specific implementations. Particularly, the accompanied drawing is only for illustrative description which shows a schematic diagram merely, rather than a physical drawing, and it should not be understood as limitation to the present invention. In order to better describe the embodiments of the present invention, some parts in the accompanied drawing will be omitted, enlarged or shrunk, but it doesn't represent the actual size of product. For those skilled in the art, it can be understood that some known structures and description thereof in the accompanied drawing may be omitted.

Identical or similar reference signs in the accompanied drawing of the embodiment of the present invention correspond to identical or similar members. In the description of the present invention, it should be understood that terms which indicate direction or position relationship such as "up", "down", "left" and "right" are only to facilitate the description of the present invention and simplify the description, rather than indicating or implying that the device or element must have specific direction, or be constructed or operated in specific direction. Therefore, terms that describe the position relationship in the accompanied drawing are only for illustrative description which should not be understood as limitation to the present invention. For those skilled in the art, the specific meanings of the above terms may be understood on a case-by-case basis.

EMBODIMENT

FIG. 1 shows an embodiment of a seawater desalination device of industrial exhaust heat-driven ejector refrigeration and an application method thereof. The seawater desalination device of industrial exhaust heat-driven ejector refrigeration, comprises a seawater collecting pool 1, a low-pressure seawater storage tank 3, an ejector refrigeration system 5 and a fresh water storage tank 7 which are successively connected. The ejector refrigeration system 5 comprises a nozzle 51 for spraying low-pressure vapor, a mixing chamber 52, a diffuser 53, a first heat-exchanger 54, a condenser 55, a condensate pump 56 and a generator 57. Bottom of the low-pressure seawater storage tank is connected with a second heat-exchanger 6. The mixing chamber 52 is connected with the nozzle 51, the diffuser 53 and the low-pressure seawater storage tank 3, respectively. The diffuser 53, the first heat-exchanger 54, the condenser 55 and the fresh water storage tank 7 are successively connected.

Particularly, the second heat-exchanger 6 is connected with the first heat-exchanger 54.

Additionally, the condenser 55, the condensate pump 56, the generator 57 and the nozzle 51 are successively connected.

Particularly, the seawater desalination device further comprises a sprayer 4. The sprayer 4 is disposed at a top position of the low-pressure seawater storage tank 3 and connected with the low-pressure seawater storage tank 3 via a pipe.

Additionally, a throttle valve 2 for throttling and depressurization is disposed between the seawater collecting pool 1 and the low-pressure seawater storage tank 3.

The present invention provides an application method for the seawater desalination device of industrial exhaust heat-driven ejector refrigeration. The application method comprises the following steps:

step 1: seawater from the seawater collecting pool 1 is throttled and depressurized through the throttle valve 2, and then the seawater runs into the low-pressure seawater storage tank 3;

step 2: after step 1, the seawater in the low-pressure seawater storage tank 3 is sprayed by the sprayer 4, a low-pressure vapor generated by evaporation of seawater is drawn in the mixing chamber 52 and mixed with a low-pressure vapor generated through the nozzle 51;

step 3: after step 2, the mixed vapor enters the diffuser 53 for adiabatic compression and pressurization to a corresponding condensing pressure, subsequently enters the first heat-exchanger 54 to be cooled by the waste seawater from the second heat-exchanger 6, and then is completely cooled into condensed water by the cooling water in the condenser 55;

step 4: after step 3, the condensed water is divided into two parts, a part of the condensed water runs into the fresh water storage tank 7 for storage and provision as fresh water to meet users' demand; after being pressurized by the condensate pump 56, the other part of the condensed water runs into the generator 57 and is heated by industrial exhaust heat to produce a high-temperature high-pressure vapor, which enters the nozzle 51; the waste seawater in the low-pressure seawater storage tank 3 after evaporation of water has a relatively low temperature, and a cooling load can be supplied for users by heat-exchanging with chilled water through the second heat-exchanger 6.

Particularly, in step 1, a pressure of the seawater which from the seawater collecting pool 1 is throttled through the throttle valve 2 is decreased and equals to a pressure of the low-pressure seawater storage tank 3.

Additionally, the low-pressure seawater storage tank 3 is adiabatic, and water in the low-pressure seawater storage tank 3 is evaporated into vapor. Because water evaporation process needs to absorb heat, the waste seawater temperature in the low-pressure seawater storage tank 3 decreases due to loss of heat. The specific operating principle is as follows:

Seawater is collected in the seawater collecting pool 1. Seawater from the seawater collecting pool 1 is throttled and depressurized through the throttle valve 2, so that the pressure thereof is in accordance with the pressure within the low-pressure seawater storage tank 3. Then the seawater runs into the low-pressure seawater storage tank 3.

Liquid water in the generator 57 is heated by the industrial exhaust heat. The heating procedure is pressure-constant, and high-temperature high-pressure vapor is generated which enters the nozzle 51 for adiabatic flow. As pressure of the vapor decreases and flow velocity increases, pressure potential energy is converted into kinetic energy of the vapor. Vapor from the nozzle 51 is a high-speed low-pressure steam flow, thereby drawing the low-pressure vapor in the seawater storage tank 3 into the mixing chamber 52. In order to sufficiently evaporate the water of seawater, the sprayer 4 is used to spray seawater so as to generate more low-pressure vapor. Vapor is mixed adiabatically in the mixing chamber 52, and the mixed low-pressure vapor enters the diffuser 53 for adiabatic flow. As the flow velocity of the vapor decreases and the pressure increases, the kinetic energy of vapor is converted into the pressure potential energy, and thus the pressure of the vapor equals to a corresponding condensing pressure. High-pressure vapor from the diffuser 53 first enters the first heat-exchanger 54 to be cooled by the waste seawater from the second heat-exchanger 6, then enters the condenser 55 to be further cooled by the cooling water and is completely turned into liquid water. The cooling process of the vapor in the first heat-exchanger 54 and the condenser 55 are at pressure-constant. Condensed water from the condenser 55 is divided into two parts, one part of the condensed water runs into the fresh water storage tank 7 for storage and provision as fresh water to meet users' demand; after being adiabatically compressed by the condensate pump 56, the other part of the condensed water runs back into the generator 57 to be heated by the industrial exhaust heat, serving as high-temperature high-pressure vapor to start the next cycle.

The low-pressure seawater storage tank 3 is adiabatic, while water of seawater in the low-pressure seawater storage tank 3 is evaporated into vapor. Evaporation of water requires heat absorption, thereby leading to loss of heat of the waste seawater in the low-pressure seawater storage tank 3 and decreased temperature of waste seawater. Low-temperature waste seawater runs into the second heat-exchanger 6 to perform heat-exchange with the chilled water, and thus the chilled water supplies cooling load that the users require. In order to utilize energy more efficiently, waste seawater from the second heat-exchanger 6 has relatively lower temperature, and it runs into the first heat-exchanger 54 to further cool the high-pressure vapor from the diffuser 53.

Apparently, the above embodiment of the present invention is merely an example for clearly explaining the present invention, rather than the limitation to the implementations of the present invention. For those skilled in the art, other changes or variation in different forms can also be made based on the above. There's no need or no way to list all implementations. Any modification, alternation or improvement made within the spirit and principle of the present invention shall fall in the scope of protection of the present invention.

What is claimed is:

1. A seawater desalination device of industrial exhaust heat-driven ejector refrigeration, characterized in that, the seawater desalination device comprises a seawater collecting pool (1), a low-pressure seawater storage tank (3), an ejector refrigeration system (5) and a fresh water storage tank (7) which are fluidly connected; the ejector refrigeration system (5) comprising a nozzle (51) for spraying low-pressure vapor, a mixing chamber (52), a diffuser (53), a first heat-exchanger (54), a condenser (55), a condensate pump (56) and a generator (57); bottom of the low-pressure seawater storage tank (3) being connected with a second heat-exchanger (6); the mixing chamber (52) being connected with the nozzle (51), the diffuser (53) and the low-pressure seawater storage tank (3), respectively; and the diffuser (53), the first heat-exchanger (54), the condenser (55) and the fresh water storage tank (7) being successively connected, wherein the second heat-exchanger (6) is connected with the first heat-exchanger (54).

2. The seawater desalination device of industrial exhaust heat-driven ejector refrigeration according to claim 1, wherein the condenser (55), the condensate pump (56), the generator (57) and the nozzle (51) are successively connected.

3. The seawater desalination device of industrial exhaust heat-driven ejector refrigeration according to claim 2, wherein the seawater desalination device further comprises a sprayer (4), the sprayer (4) being disposed at a top position of the low-pressure seawater storage tank (3) and connected with the low-pressure seawater storage tank (3) via a pipe.

4. The seawater desalination device of industrial exhaust heat-driven ejector refrigeration according to claim 3, wherein a throttle valve (2) for throttling and depressurization is disposed between the seawater collecting pool (1) and the low-pressure seawater storage tank (3).

5. An application method for the seawater desalination device of industrial exhaust heat-driven ejector refrigeration according to claim 4, characterized in that, the application method comprises the following steps:

step 1: seawater from the seawater collecting pool (1) is throttled and depressurized through the throttle valve (2), and then the seawater runs into the low-pressure seawater storage tank (3);

step 2: after step 1, the seawater in the low-pressure seawater storage tank (3) is sprayed by the sprayer (4), a low-pressure vapor generated by evaporation of seawater is drawn in the mixing chamber (52) and mixed with a low-pressure vapor generated through the nozzle (51), wherein waste seawater in the low-pressure seawater storage tank (3) runs into the second heat-exchanger (6);

step 3: after step 2, the mixed vapor enters the diffuser (53) for adiabatic compression and pressurization to a corresponding condensing pressure, subsequently enters the first heat-exchanger (54) to be cooled by the waste seawater from the second heat-exchanger (6), and then is completely cooled into condensed water by cooling water in the condenser (55);

step 4: after step 3, the condensed water is divided into two parts, one part of the condensed water runs into the fresh water storage tank (7) for storage and provision as fresh water to meet users' demand; after being pressurized by the condensate pump (56), the other part of the condensed water runs into the generator (57) and is heated by industrial exhaust heat to produce a high-temperature high-pressure vapor, which enters the nozzle (51); the waste seawater in the low-pressure seawater storage tank (3) after evaporation of water has a relatively low temperature, and a cooling load is supplied for users by heat-exchanging with chilled water through the second heat-exchanger (6).

6. The application method for the seawater desalination device of industrial exhaust heat-driven ejector refrigeration according to claim 5, wherein in step 1, the seawater from the seawater collecting pool (1) having a first pressure higher than a pressure of the low-pressure seawater tank (3) is provided to the throttle valve (2), wherein the seawater is throttled and depressurized by the throttle valve (2) and decreases to a second pressure which is equal to the pressure of the low-pressure seawater storage tank (3).

7. The application method for the seawater desalination device of industrial exhaust heat-driven ejector refrigeration according to claim 6, wherein the low-pressure seawater storage tank (3) is adiabatic, water in the low-pressure seawater storage tank (3) is evaporated into vapor, while water evaporation absorbs heat, and a waste seawater temperature in the low-pressure seawater storage tank (3) decreases due to loss of heat.

\* \* \* \* \*